US011841733B2

(12) United States Patent
Zhang et al.

(10) Patent No.: US 11,841,733 B2
(45) Date of Patent: Dec. 12, 2023

(54) METHOD AND SYSTEM FOR REALIZING FPGA SERVER

(71) Applicant: Institute of Computing Technology, Chinese Academy of Sciences, Beijing (CN)

(72) Inventors: Ke Zhang, Beijing (CN); Yazhou Wang, Beijing (CN); Mingyu Chen, Beijing (CN); Yisong Chang, Beijing (CN); Ran Zhao, Beijing (CN); Yungang Bao, Beijing (CN)

(73) Assignee: Institute of Computing Technology, Chinese Academy of Sciences, Beijing (CN)

( * ) Notice: Subject to any disclaimer, the term of this patent is extended or adjusted under 35 U.S.C. 154(b) by 0 days.

(21) Appl. No.: 17/791,511

(22) PCT Filed: Jan. 8, 2020

(86) PCT No.: PCT/CN2020/070974
§ 371 (c)(1),
(2) Date: Jul. 7, 2022

(87) PCT Pub. No.: WO2021/138846
PCT Pub. Date: Jul. 15, 2021

(65) Prior Publication Data
US 2023/0101208 A1 Mar. 30, 2023

(51) Int. Cl.
*G06F 13/42* (2006.01)
(52) U.S. Cl.
CPC ............... *G06F 13/4282* (2013.01)
(58) Field of Classification Search
None
See application file for complete search history.

(56) References Cited

U.S. PATENT DOCUMENTS 6,760,898 B1 * 7/2004 Sanchez ......... G01R 31/318519
716/111
7,814,255 B1 * 10/2010 Deva ................... G06F 13/4081
710/10

(Continued)

FOREIGN PATENT DOCUMENTS

CN 102693141 A 9/2012
CN 103678248 A 3/2014
(Continued)

OTHER PUBLICATIONS

International Search Report for International Application No. PCT/CN2020/070974 dated Sep. 25, 2020.

*Primary Examiner* — Henry Tsai
*Assistant Examiner* — Christopher A Bartels
(74) *Attorney, Agent, or Firm* — MASCHOFF BRENNAN (57) ABSTRACT

A method and system for realizing a FPGA server, wherein centralized monitoring and managing all SoC FPGA compute nodes within the server by a motherboard, the motherboard comprising: a plurality of self-defined management interfaces for connecting the SoC FPGA compute nodes to supply power and data switch to the SoC FPGA compute nodes; a management network switch module for interconnecting the SoC FPGA compute nodes and supplying management; and a core control unit for managing the SoC FPGA compute nodes through the self-defined management interfaces and a self-defined management interface protocol, and acquiring operating parameters of the SoC FPGA compute nodes to manage and monitor the SoC FPGA compute nodes based on the management interface protocol.

8 Claims, 3 Drawing Sheets

(56) References Cited

U.S. PATENT DOCUMENTS

| | | | |
|---|---|---|---|
| 9,276,393 B2* | 3/2016 | Ostrovsky | H02H 3/335 |
| 9,432,298 B1* | 8/2016 | Smith | H04L 49/9057 |
| 9,792,243 B2 | 10/2017 | Belvins et al. | |
| 9,992,094 B1* | 6/2018 | Singh | H04L 43/14 |
| 10,396,541 B2* | 8/2019 | Ostrovsky | H02H 3/044 |
| 10,425,001 B2* | 9/2019 | Mari Curbelo | H02M 1/08 |
| 10,530,077 B2* | 1/2020 | Khan | H01R 43/20 |
| 11,258,195 B2* | 2/2022 | Kimura | H01R 12/724 |
| 11,444,400 B2* | 9/2022 | Ziegler, IV | H01R 13/518 |
| 2014/0092503 A1* | 4/2014 | Ostrovsky | H02H 3/338 |
| | | | 361/45 |
| 2014/0269471 A1* | 9/2014 | Wagh | G06F 1/3278 |
| | | | 370/311 |
| 2018/0331081 A1* | 11/2018 | Goh | H05K 3/303 |
| 2018/0337587 A1* | 11/2018 | Mari Curbelo | H03K 17/28 |
| 2019/0245911 A1 | 8/2019 | Chandran et al. | |
| 2019/0354163 A1* | 11/2019 | Bodnaruk | G06F 13/4282 |
| 2020/0218631 A1* | 7/2020 | Wang | H03K 19/17704 |
| 2020/0371828 A1* | 11/2020 | Chiou | G06F 9/5055 |
| 2022/0100692 A1* | 3/2022 | Subbareddy | G06F 30/30 |
| 2022/0121608 A1* | 4/2022 | Waechter | G06F 13/28 |
| 2022/0210950 A1* | 6/2022 | Geng | H01L 23/36 |

FOREIGN PATENT DOCUMENTS

| | | |
|---|---|---|
| CN | 103970214 A | 8/2014 |
| CN | 104063300 A | 9/2014 |
| CN | 105808462 A | 7/2016 |
| CN | 107046542 A | 8/2017 |
| CN | 107102699 A | 8/2017 |
| CN | 107193713 A | 9/2017 |
| CN | 107729284 A | 2/2018 |
| CN | 108227857 A | 6/2018 |
| CN | 108829515 A | 11/2018 |
| CN | 110399220 A | 11/2019 |

* cited by examiner

FIG. 5 ional application of PCT/CN2020/070974, filed on Jan. 8, 2020. The contents of PCT/CN2020/070974 are all hereby incorporated by reference.

METHOD AND SYSTEM FOR REALIZING FPGA SERVER

CROSS REFERENCE TO RELATED APPLICATIONS

This application is a national application of PCT/CN2020/070974, filed on Jan. 8, 2020. The contents of PCT/CN2020/070974 are all hereby incorporated by reference.

BACKGROUND OF THE INVENTION

1. Field of the Invention

The invention relates to a computer architecture structure and the field of FPGA (Field Programmable Gate Array) heterogeneous acceleration, and particularly to a method and system for realizing a FPGA server.

2. Related Art

Development speed of the semiconductor process gradually becomes a bottleneck for restraining performance of the computer system, the traditional serial processing technique cannot satisfy human's requirements, and human begin to pay attention on the parallel computing FPGA. Due to advantages of high efficiency and powerful programmable capability, the FPGA gradually becomes a solution of breaking through the bottleneck of the existing system performance. In the fields such as media compression, encryption and decryption, AI, and big data processing, as compared to the traditional CPU and GPU, the FPGA solution may reach several times even dozens of times of energy efficiency improvement. However, technical threshold of the FPGA is relatively high, and building a FPGA hardware platform has a high cost and a long period, so it is difficult for the FPGA to be adapted to rapidly changing market economy. In order to pursuit optimization of economy and benefit, FPGA cloud platform emerges as the times require, the operators supply a stable FPGA hardware platform and a whole set of development environment to the users, and the users pay a relatively low price such that a high-end FPGA resource can be used to develop their projects quickly. In recent years, development of the FPGA cloud is developing fast. In April 2017, Amazon officially launched EC2 (Elastic Compute Cloud) F1 of the FPGA, and in the same year, Chinese internet giants BAT and Huawei also announced carrying out business of FPGA cloud accelerators. Such strong wind of the FPGA cloud is visible.

Figure 1:
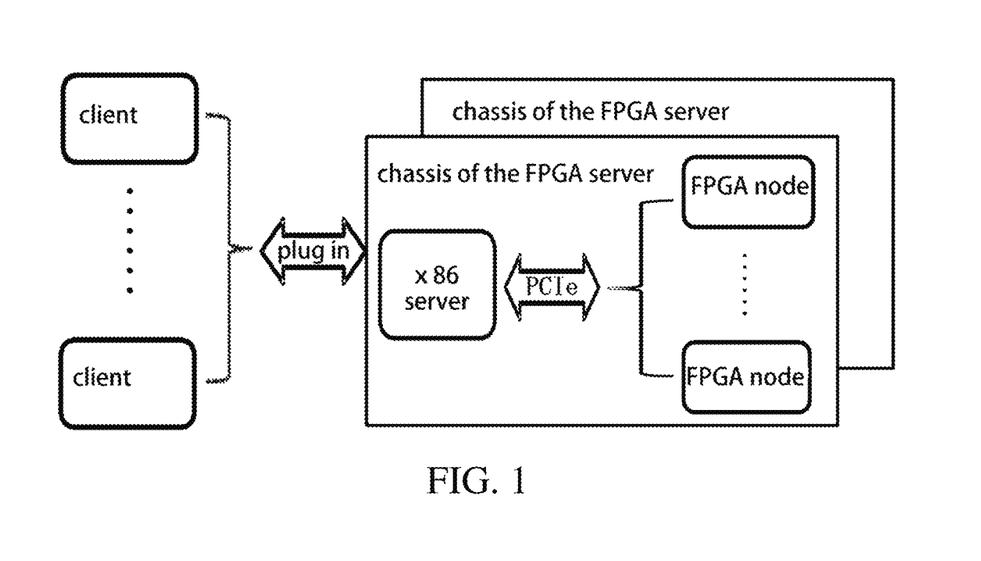
FIG. 1 is a basic framework diagram of the existing FPGA cloud platform.

Currently, as for the FPGA cloud platform of the existing main operators, a basic framework is shown in FIG. 1, and mainly includes three parts: client, server and FPGA node. The client is mounted on a local PC of the users, the FPGA cloud platform also can be logged in through a webpage, and data interaction between the client and the server is performed through the internet. The server is mainly consisting of x86 (or an architecture such as ARM, Power) servers, and has integrated with a whole set of development tools desired by development of application program, and development of FPGA accelerating logic. Operators take the x86 server and the FPGA nodes as an integral body to be supplied for the users, and the FPGA nodes only include logic resource. That is, the prior art supplies an x86 server including a FPGA accelerator card to the users, and the FPGA accelerator card is connected to the x86 server through standard PCIe interfaces to accelerate the hardware.

Data interaction between the server and the FPGA node is performed through PCIe interfaces, due to limitation of an interface form, the FPGA nodes shall be deployed in a chassis of the x86 server, and the number of the FPGA nodes deployable in one x86 server often does not exceed eight according to a size of the chassis and the number of PCIe interfaces on the main board. For example, a computing pool in each Amazon's EC2 F1 of FPGA can configure eight FPGA nodes at most. In the existing x86 server framework, it is difficult for the FPGA nodes to deploy at a high density, and if performing large amounts of FPGA nodes deployment, a large number of x86 servers is required, so deployment has a high cost, and plenty of physical space is occupied.

The existing commercial FPGA cloud platform uses the x86 server and the FPGA nodes as a resource to be supplied for the users, and the users can develop application software in the x86 server, and also can complete development of the FPGA accelerating logic in the x86 server. After the development is completed, the x86 server and the FPGA node as a whole provide users with a high-performance network acceleration service. Such use mode tends to be commercial, and with respect to different user groups, such mode is not optimal. If the users using the FPGA cloud platform does not aim to obtain a server for accelerating the network, but only to learn or use a FPGA board card to develop the FPGA logic (e.g., the field of teaching), under such scenario, the x86 server is not necessary, the architecture of the x86+FPGA nodes is obviously a waste of resources.

Moreover, design concept of the commercial FPGA cloud platform does not aim to deploy the FPGA nodes, so it is not flexible in deployment, management and use of the FPGA nodes (e.g., powering on and off the multiple FPGA nodes dynamically). It is difficult for the existing FPGA cloud platform to deploy the FPGA nodes at a high density, with respect to specific user group, it will cause a waste of x86 server resources, and under the existing framework, it is not flexible in management and use of the FPGA nodes.

As for the existing FPGA cloud platform, the users log in the x86 server system through the local client or webpage, and complete development of the application program and the FPGA accelerating logic under the development environment provided by the operators, and finally, the x86 server+the FPGA nodes are deployed to be a self-defined network accelerating server for the users.

Due to limitation of the overall framework, it is difficult to deploy the FPGA nodes at a high density.

If the users only aim to learn or use the FPGA board card, not to deploy a network accelerating server, it will cause a waste of the x86 server resource.

The commercial x86 server is not designed for the FPGA, and it is not flexible in management and use of the FPGA nodes. The commercial FPGA server is more dependent on a PCIe interfaces, and after the PCIe interfaces is established, the FPGA nodes can be used. The mainly purpose of the PCIe interfaces is high speed data interaction, and under the scenario of the FPGA server, it is not flexible to control and debug the FPGA nodes. Although the PCIe interfaces provide the debugging interfaces such as JTAG, most of server hosts neither use nor support these interfaces.

SUMMARY OF THE INVENTION

To surmount deficiencies of the existing FPGA cloud platform, the invention is designed to further reduce deployment and maintenance cost of the FPGA cloud platform, improve use ratio of the hardware resource, improve a deployment density of the FPGA nodes, increase use ratio of physical space, enhance control and monitoring capability of the FPGA nodes, and automatically develop and customize a chassis and an intelligent managing and dynamic dispatching system, thereby providing a convenient, fast and cheap FPGA resource to users.

With respect to deficiencies of the prior art, the invention provides a system for realizing a FPGA server, wherein centralized monitoring and management of resource of all SoC FPGA (a FPGA device integrated with processor core) compute nodes within a chassis are realized by a motherboard, the motherboard comprising:

a plurality of self-defined management interfaces for connecting the SoC FPGA compute nodes to supply power and data exchange to the other SoC FPGA compute nodes;

a management network exchange module for interconnecting the SoC FPGA compute nodes and supplying management network; and a core control unit for managing the SoC FPGA compute nodes through the self-defined management interfaces and a self-defined management interface protocol, and acquiring operating parameters of the SoC FPGA compute nodes to manage and monitor the SoC FPGA compute nodes based on the management interface protocol.

In the system for realizing a FPGA server, the management and monitoring functions comprises power on, power off, remote logic configuration of the FPGA, remote debugging, power monitoring, temperature monitoring, serial interaction and online update of motherboard firmware.

In the system for realizing a FPGA server, the core control unit comprises a processor portion and a programmable logic portion; a processor core of the processor portion is responsible for operating an operating system or a management program for management, and providing drive service of various management interfaces; the programmable logic portion is a programmable logic resource for controlling interface logic timing of the plurality of self-defined management interfaces.

In the system for realizing a FPGA server, the core control unit monitors whether the self-defined management interfaces are plugged with the SoC FPGA compute nodes, and if yes, manages and monitors through the self-defined management interfaces;

the management and monitoring functions comprise monitoring information of powering on and off, an input voltage and an input current of all SoC FPGA compute nodes, and monitoring a working state of the SoC FPGA compute nodes plugging into the self-defined management interfaces;

and the self-defined management interfaces, the management network exchange module and the core control unit together form a management plane network;

the SoC FPGA compute nodes output user data to a data network exchange module through a data network interface, and the network of the data network exchange module is isolated from management network of the motherboard.

In the system for realizing a FPGA server, the SoC FPGA compute nodes comprise a self-defined golden finger connected to the self-defined management interfaces, the self-defined golden finger has a height difference from a standard PCIe golden finger of the SoC FPGA compute nodes, and the height difference is greater than or equal to 12.75 mm/501.97 mil.

The invention further provides a method for realizing a FPGA server, wherein centralized monitoring and management of resource of all SoC FPGA compute nodes within a chassis are realized by a motherboard, comprising:

step 1, connecting the SoC FPGA compute nodes to supply power and data exchange to the SoC FPGA compute nodes through self-defined management interfaces;

step 2, interconnecting the SoC FPGA compute nodes and supplying management network through a management network exchange module; and step 3, setting a management interface protocol of the SoC FPGA compute nodes, and acquiring operating parameters of the SoC FPGA compute nodes to manage and monitor the SoC FPGA compute nodes based on the management interface protocol through the core control unit.

In the method for realizing a FPGA server, the management and monitoring functions comprises power on, power off, remote logic configuration of the FPGA, remote debugging, power consumption monitoring, temperature monitoring, serial interaction and online update of motherboard firmware.

In the method for realizing a FPGA server, the core control unit comprises a processor portion and a programmable logic portion; a processor core of the processor portion is responsible for operating an operating system or a management program for management, and providing drive service of various management interfaces; the programmable logic portion is a programmable logic resource for controlling interface logic timing of the plurality of self-defined management interfaces.

In the method for realizing a FPGA server, the core control unit monitors whether the self-defined management interfaces are plugged with the SoC FPGA compute nodes, and if yes, manages and monitors through the self-defined management interfaces;

the management and monitoring functions comprises monitoring information of powering on and off, an input voltage and an input current of all SoC FPGA compute nodes, and monitoring a working state of the SoC FPGA compute nodes plugged into the self-defined management interfaces;

and the self-defined management interfaces, the management network exchange module and the core control unit together form a management plane network;

the SoC FPGA compute nodes output user data to a data network exchange module through a data network interface, and data network of the data network exchange module is isolated from management network of the motherboard.

In the method for realizing a FPGA server, the SoC FPGA compute nodes comprise a self-defined golden finger connected to the self-defined management interfaces, the self-defined golden finger has a height difference from a standard PCIe golden finger of the SoC FPGA compute nodes, and the height difference is greater than or equal to 12.75 mm/501.97 mil.

As can be known from the above solution, advantages of the invention lie in:

1. allowing FPGA resource in the FPGA server to be more compact, and have a higher density;

2. simplifying wiring cost within the chassis, simplifying complexity of assembly, and reducing maintenance difficulty;

3. controlling and monitoring the FPGA resource comprehensively, complexly and flexibly through the self-defined management interface protocol;

4. The management plane network within the chassis is independent of the data plane network, thereby avoiding sudden transmission of the management network from affecting network bandwidth performance of the data network, and improving data security.

PREFERABLE EMBODIMENTS OF THE INVENTION

The existing FPGA cloud platform mainly aims to provide an x86 (or an architecture such as ARM, Power) server containing FPGA accelerator resource (such as, a FPGA card in a form of PCIe) to users through cloud, and FPGA accelerating logic can be developed by the users conveniently. The x86 server itself is integrated with a whole set of software and hardware development environment, data interaction between the server and the FPGA nodes is performed through PCIe interfaces, including configuration, debugging and management of the FPGA. Physically, FPGA nodes are deployed inside the server chassis.

The invention is mainly designed to further reduce deployment and maintenance cost of the FPGA cloud platform, improve the hardware resource utilization, improve a deployment density of the FPGA nodes, increase use ratio of physical space, and automatically develop and customize a chassis and an intelligent managing and dynamic dispatching environment of the cloud platform, thereby providing a convenient, fast and cheap FPGA resource to users.

The technical difficulty and the solved technical problem of the invention are how to realize a management system of a FPGA server to deploy the FPGA resource at a higher density. Specifically, key points of the invention comprise:
1. interconnection inside the server through self-defined management interfaces; technical effect: since network switch chips are integrated onto a motherboard, the density of FPGA servers can be improved;
2. an independent control management unit; technical effect: management and maintenance are more convenient;
3. design of the self-defined management interfaces; technical effect: the physical form of the self-defined management interfaces is not limited to a standard PCIe interface, and the signals are defined to be powering and management bus or signal desired for the FPGA server, which can largely simplify routing within the chassis.

To describe the features and effects of the invention more apparent, hereinafter examples are listed, and detailed explanations are made in accompanying with the drawings.

Figure 2:
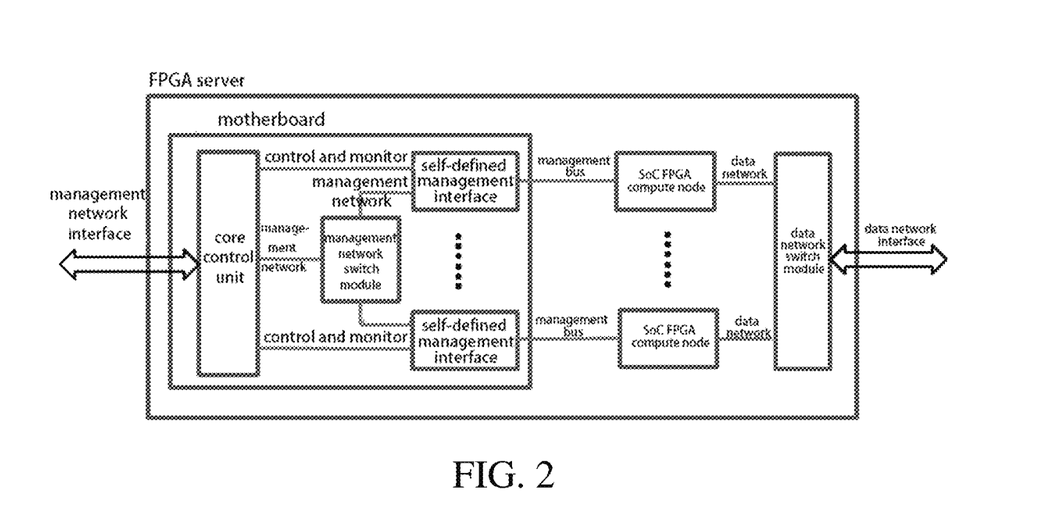
FIG. 2 is a structural diagram of the invention.

As shown in FIG. 2, the invention provides centralized monitoring and management of all SoC FPGA compute nodes within a chassis using a motherboard (BH motherboard) inside the server.

Figure 3:
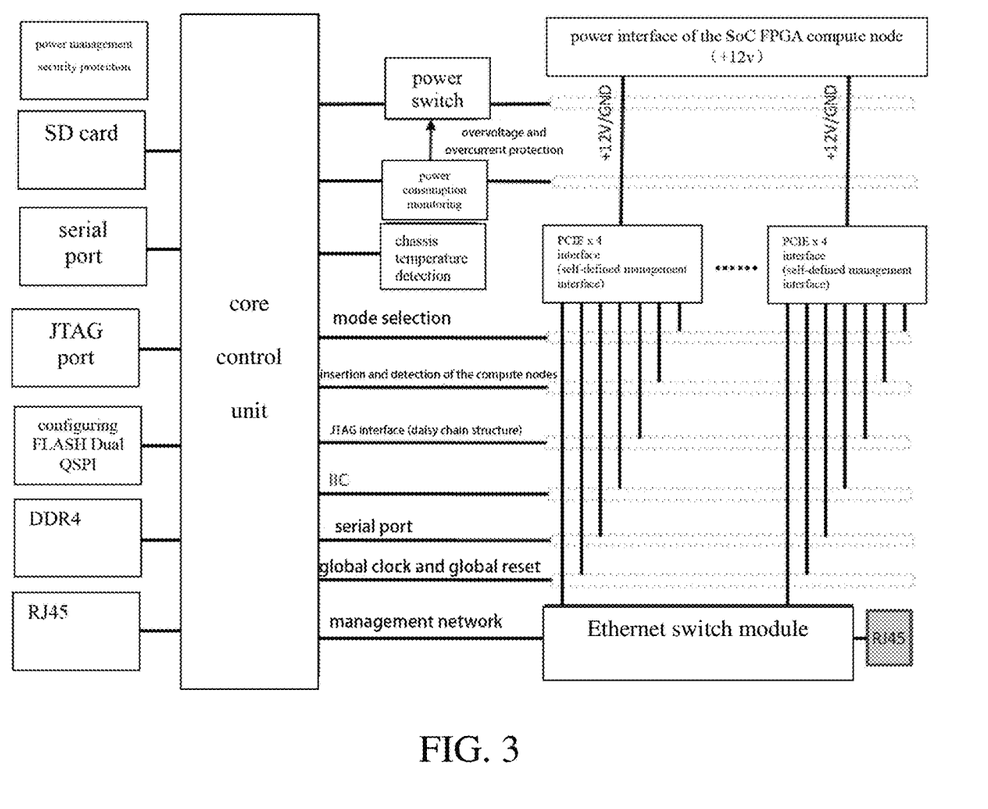
FIG. 3 is an exemplary diagram of a structure of a motherboard.

FIG. 3 is an example of a structure of the motherboard. A core control unit is the core of the motherboard, and an Ethernet switch module is configured for switching of management network. The core control unit can operate an operating system (e.g., Linux), and is integrated with environments desired for management, dispatch and detection to monitor and manage SoC FPGA computing units through the self-defined management interfaces (the physical form of the self-defined management interfaces in this example is PCIe x4 golden finger sockets).

The core control unit can be a FPGA device with an ARM hard core, also can be a FPGA device with a processor soft core (which can be different instruction sets, such as, ARM, RISC-V, etc.), or other control chips. The core control unit can operate the operating system, and also can directly operate management and monitoring programs.

The physical form of the self-defined management interfaces can be PCIe sockets and PCIe golden fingers, and also can be sockets and golden fingers in other physical form. The management interfaces are integrated with a self-defined management interface protocol, and better realizes monitoring and management of the motherboard on the SoC FPGA compute nodes. In order to own better universality and the requirement for developing SoC FPGA resource, the self-defined management interface protocol can be integrated with standard interface protocols such as Ethernet, serial port, a Joint Test Action Group (JTAG) port and Inter-Integrated Circuit (IIC) port, and also can be integrated with functional signals such as powering, plug-in detection of the SoC FPGA compute nodes, global clock and global reset.

Figure 4:
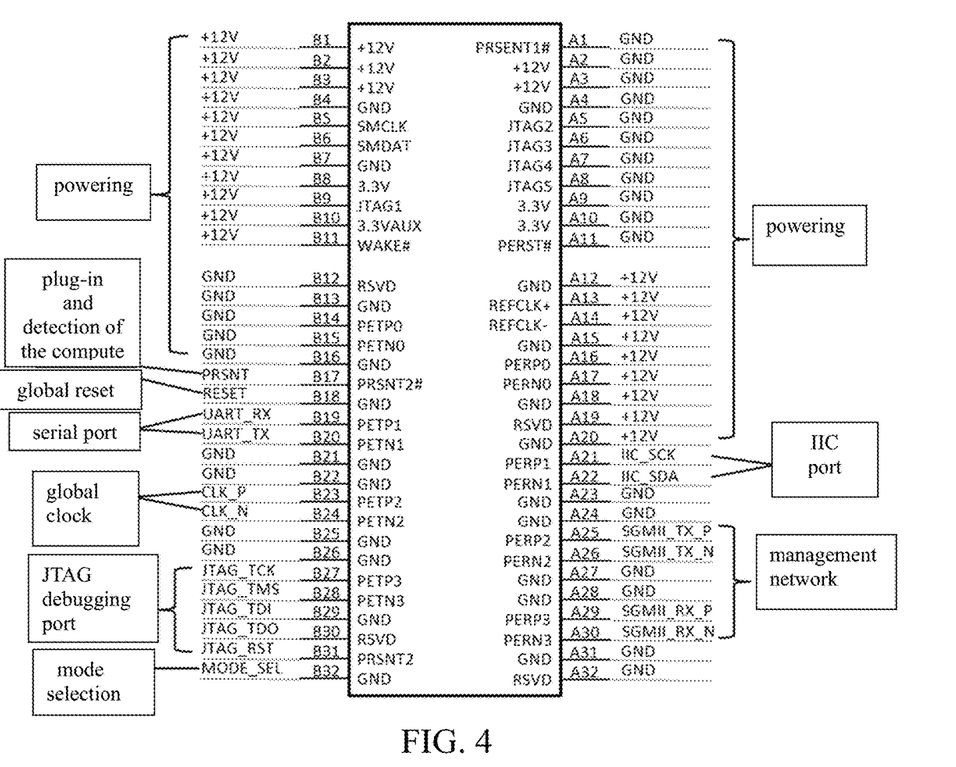
FIG. 4 is a schematic diagram of distribution of signals of self-defined management interfaces (golden finger sockets).

FIG. 4 shows an example of the self-defined management interfaces, and the physical form of the interfaces in this example is PCIe x4 interfaces (PCIe x4 sockets). In FIG. 4, pins in the box are defined to be signals of the standard PCIe interfaces, and signals of external connection are defined to be the self-defined management interfaces signals.

Power interfaces are configured to supply power to the SoC FPGA compute nodes, the maximum power of each management interface is 300 W, which is sufficient to satisfy powering requirement of most hardware board cards. Whether the power interface supplies power can be controlled dynamically by the motherboard.

Insertion detection pins of the compute nodes are configured to detect whether the SoC FPGA compute nodes are plugged to the motherboard, and through the signal, the motherboard can dynamically monitor and obtain the number of the SoC FPGA compute nodes, and dynamically dispatch according to the number of available resources.

Global reset signal is configured to globally reset the SoC FPGA compute nodes, and when the SoC FPGA compute nodes have faults, it ensures that an initial state can be reset.

JTAG debug port is configured to support configuration and debugging functions for the SoC FPGA compute nodes in the process of technique development.

Mode selection: the signal determines whether the SoC FPGA compute nodes work in a mode of the FPGA server. This signal enables the SoC FPGA compute nodes to have better compatibility, can be used and developed in the FPGA server provided in the invention, and also can be compatible with commercial FPGA servers.

IIC port: the self-defined management interfaces are integrated with an IIC port to control most kinds of sensors. The sensors are used to support monitoring of information such as voltage, current, temperature and power on the SoC FPGA compute nodes, and realize protection mechanism such as overvoltage, overcurrent and over-temperature on such basis.

Management network: the SoC FPGA compute nodes own a processor core inside, and in order to interact with the processor core, the self-defined management interfaces are integrated with an Ethernet interface (management network)

to realize communication between the motherboard and the management network of the SoC FPGA compute nodes. Through the management network, the motherboard can better monitor a working state, performance parameters and some other information of the processor core on the SoC FPGA compute nodes, and enhance capability of the motherboard for controlling the SoC FPGA compute nodes.

The commercial FPGA servers in the prior art are limited to the interface form, and the FPGA nodes must be connected to the x86 (or the architecture such as ARM, Power) server through the standard PCIe interfaces. The maximum power supplied by the standard PCIe interfaces is 75 W, but powers of most high-performance FPGA nodes are greater than 75 W, so it is necessary to power separately or additionally through other power interfaces on the FPGA nodes, which increases complexity of wiring in the chassis of the server.

In terms of configuration of the FPGA nodes, the commercial FPGA servers in the prior art configure the FPGA nodes through PCIe interfaces, which shall use a part of reconfigurable technique. Firstly, the PCIe interface portion of the FPGA nodes shall be configured, and configuration of other logic resource is realized through the PCIe interfaces. Therefore, the FPGA nodes must consume a part of logic resource for supporting the PCIe interfaces, and the remaining logic resource is allocable, while also requiring support of a part of the reconfigurable technique, which increases complexity of the system. The FPGA server provided in the invention is integrated with the JTAG port on the self-defined management interfaces, and can directly make complete configuration to the SoC FPGA compute nodes, so it is simpler and more efficient.

As for the commercial FPGA servers in the prior art, the FPGA modes are mostly configured to develop accelerating logic, while also limited to the standard PCIe interfaces, and if the FPGA is integrated with the processor core, it is difficult to debug the processor core on the FPGA nodes. As for the FPGA servers provided in the invention, the self-defined management interfaces are integrated with the serial port and the Ethernet interface (management network), which facilitates development of the processor core of the FPGA compute nodes and the operating system (e.g., Linux).

Figure 5:
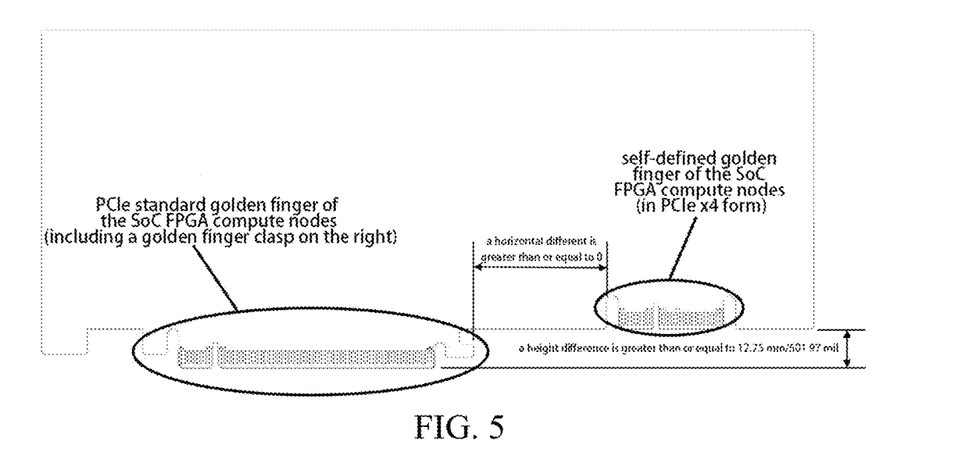
FIG. 5 is a schematic diagram of self-defined management interfaces on SoC FPGA compute nodes.

The SoC FPGA compute nodes can use a standard PCIe board card shape, but an additional self-defined golden finger is necessary on the board card to interconnect with the motherboard of the FPGA server. The self-defined golden finger on the SoC FPGA compute nodes has a determined height difference from a standard PCIe golden finger, thereby ensuring that the user board card also can be plugged into a PCIe socket of the chassis of the standard server, the physical form of the self-defined golden finger in this example is a PCIe x4 golden finger, and appearance is shown in FIG. 5. Specifically, positions of the self-defined golden finger and the standard PCIe golden finger have a determined height difference (which is greater than or equal to 12.75 mm/501.97 mil), thereby ensuring that the board card of the SoC FPGA compute nodes also can be plugged into the PCIe socket of the chassis of the standard server, which ensures the self-defined golden finger portion of the board card of the SoC FPGA compute nodes not to make structural interference with components on the main board of the standard server, and also remain the maximum layout space of the SoC FPGA compute nodes. Alternatively, an edge of a self-defined physical interface cannot exceed a range of bezel of the standard PCIe board card specification, and the maximum situation is that the edge of the self-defined physical interface is flushed with an edge of the bezel of the standard PCIe board card specification. As can be seen from a periphery, the board card with the self-defined golden finger is ensured to still conform to machine size specification of the PCIe board card. On the other hand, as for a horizontal direction, a difference of horizontal distances between the self-defined golden finger and the standard PCIe golden finger (including a golden finger clasp) is greater than or equal to 0, thereby ensuring that the self-defined golden finger and the standard PCIe golden finger can plug into corresponding connector sockets. Appearance is shown in FIG. 5.

In addition to the multiple SoC FPGA compute nodes and the BH motherboard, the chassis of the server further comprises an independent high-speed Ethernet switch for directly data interconnection of the SoC FPGA compute nodes, and an AC-DC power module of the chassis.

A key point of the invention is to provide resource monitoring and management network of the SoC FPGA compute nodes within the chassis of the FPGA server using a BH motherboard, and the BH motherboard interconnects the SoC FPGA compute nodes directly using a self-defined management interface (e.g., a PCIe golden finger socket), while removing lots of wirings of the power supply and the management network inside the traditional chassis, thereby facilitating deploying and debugging. In addition, the invention slightly modifies appearance of the SoC FPGA compute nodes, and only additionally adds a self-defined golden finger without affecting compatibility of the chassis of the standard server.

The BH motherboard controls and monitors the FPGA servers comprehensively. The BH motherboard completes user login and management, dispatching and allocating resource of the SoC FPGA compute nodes, managing and monitoring user state, and managing and monitoring a working state of the SoC FPGA compute nodes. The BH motherboard is integrated with support of software and hardware desired in the process of use and deployment.

Management bus is a self-defined interface bus for management and interaction of the BH motherboard on the SoC FPGA compute nodes, and comprises powering, power supply monitoring (voltage, current, power, etc.), temperature monitoring, and state monitoring of the SoC FPGA compute nodes, configuration, debugging, resetting, clock, and serial port information interaction. The SoC FPGA compute nodes can supply specific data network interface to users, the users can make data transmission to the users through the interface, and the data network is isolated from the management network of the FPGA server. Due to lacking management of the motherboard on the FPGA nodes, the existing commercial FPGA servers shall manage the FPGA board card by means of the external x86 server or CPU through a standard PCIe interfaces, which is not flexible, and also lacks security, because user data and management data shall all pass through the PCIe interfaces, so network bandwidths affect each other, and there is potential safety hazard.

Here is the use process of the invention. Firstly, the users shall log in the FPGA server through username and password, after login successfully, applying for resource of the SoC FPGA compute nodes, then users can directly develop the logic function of the SoC FPGA compute nodes. The BH motherboard is integrated with basic functions such as remote configuration and debugging desired in the development process.

The invention provides a method for realizing a FPGA server, wherein centralized monitoring and management of resource of all SoC FPGA compute nodes within a chassis are realized by a motherboard, comprising:

step 1, connecting the SoC FPGA compute nodes to supply power and data switch to the SoC FPGA compute nodes through self-defined management interfaces;

step 2, interconnecting the SoC FPGA compute nodes and supplying management network through a management network switch module; and step 3, setting a management interface protocol of the SoC FPGA compute nodes, and acquiring operating parameters of the SoC FPGA compute nodes to manage and monitor the SoC FPGA compute nodes based on the management interface protocol through a core control unit.

In the method for realizing a FPGA server, the management and monitoring functions comprises power on, power off, remote logic configuration of the FPGA, remote debugging, power consumption monitoring, temperature monitoring, serial interaction and online update of motherboard firmware.

In the method for realizing a FPGA server, the core control unit comprises a processor portion and a programmable logic portion; a processor core of the processor portion is responsible for operating an operating system or a management program for management, and providing drive service of various management interfaces; the programmable logic portion is responsible for controlling interface logic timing of self-defined management interfaces.

In the method for realizing a FPGA server, the core control unit monitors whether the self-defined management interfaces are plugged with the SoC FPGA compute nodes, and if yes, manages and monitors through the self-defined management interfaces;

the management and monitoring functions comprises monitoring information of powering on and off, an input voltage and an input current of all SoC FPGA compute nodes, and monitoring a working state of the SoC FPGA compute nodes plugging into the self-defined management interfaces;

and the self-defined management interfaces, the management network switch module and the core control unit together form a management plane network;

the SoC FPGA compute nodes output user data to a data network switch network of the motherboard.

In the method for realizing a FPGA server, the SoC FPGA compute nodes comprise a self-defined golden finger connected to the self-defined management interfaces, the self-defined golden finger has a height difference from a standard PCIe golden finger of the SoC FPGA compute nodes, and the height difference is greater than or equal to 12.75 mm/501.97 mil.

INDUSTRIAL APPLICABILITY

The invention provides a method and system for realizing a FPGA server, wherein centralized monitoring and managing all SoC FPGA compute nodes within the server by a motherboard, the motherboard comprising: a plurality of self-defined management interfaces for connecting the SoC FPGA compute nodes to supply power and data switch to the SoC FPGA compute nodes; a management network switch module for interconnecting the SoC FPGA compute nodes and supplying management; and a core control unit for managing the SoC FPGA compute nodes through the self-defined management interfaces and a self-defined management interface protocol, and acquiring operating parameters of the SoC FPGA compute nodes to manage and monitor the SoC FPGA compute nodes based on the management interface protocol. Advantages of the invention are to control and monitor the SoC FPGA compute nodes comprehensively, complexly and flexibly through the self-defined management interfaces and self-defined protocol, and the management plane network is independent of the data plane network to enhance broadband performance, and improve data security.

What is claimed is:

1. A system for realizing a Field Programmable Gate Array (FPGA) server, wherein centralized monitoring and managing all System-on-Chip Field-Programmable Gate Array (SoC FPGA) compute nodes within a chassis by a motherboard, the motherboard comprising:

a plurality of self-defined management interfaces for connecting the SoC FPGA compute nodes to supply power and data switch to the SoC FPGA compute nodes;

a management network switch module for interconnecting the SoC FPGA compute nodes and supplying management network; and a core control unit for managing the SoC FPGA compute nodes through the self-defined management interfaces and a self-defined management interface protocol, and acquiring operating parameters of the SoC FPGA compute nodes to manage and monitor the SoC FPGA compute nodes;

the self-defined management interface includes: power supply pins that provide power for SoC FPGA compute nodes, insertion detection pins of the compute nodes are configured to detect whether the SoC FPGA compute nodes are plugged into the motherboard, a Joint Test Action Group (JTAG) port for configuring and debugging SoC FPGA computing nodes, and an Inter-Integrated Circuit (IIC) port for monitoring the working status of Soc FPGA compute nodes;

wherein the SoC FPGA compute nodes comprise a self-defined golden finger connected to the self-defined management interfaces, the self-defined golden finger has a height difference from a standard PCIe golden finger of the SoC FPGA compute nodes, and the height difference is greater than or equal to 12.75 mm/501.97 mil In the PGPUB specification.

2. The system for realizing an FPGA server according to claim 1, wherein the management and monitoring functions comprises power on, power off, remote logic configuration of the FPGA, remote debugging, power consumption monitoring, temperature monitoring, serial port interaction and online update of motherboard firmware.

3. The system for realizing an FPGA server according to claim 1, wherein the core control unit comprises a processor portion and a programmable logic portion; a processor core of the processor portion is responsible for operating an operating system or a management program for management, and providing drive service of various management interfaces; the programmable logic portion is used to control interface logic sequence of the plurality of self-defined management interfaces.

4. The system for realizing an FPGA server according to claim 1, wherein the core control unit monitors whether the self-defined management interfaces are plugged with the SoC FPGA compute nodes, and if yes, manages and monitors through the self-defined management interfaces;

the management and monitoring functions comprises monitoring information of power status, the input voltage and input current of all SoC FPGA compute nodes, and monitoring a working state of the SoC FPGA compute nodes plugging into the self-defined management interfaces;

and the self-defined management interfaces, the management network switch module and the core control unit together form a management plane network;

the SoC FPGA compute nodes output user data to a data network switch module through the interface, and data network is isolated from management network of the motherboard.

5. A method for realizing a Field Programmable Gate Array (FPGA) server, wherein centralized monitoring and managing all System-on-Chip Field-Programmable Gate Array (SoC FPGA) compute nodes within a chassis are realized by a motherboard, comprising:

step 1, connecting the SoC FPGA compute nodes to supply power and data switch to the SoC FPGA compute nodes through self-defined management interfaces;

step 2, interconnecting the SoC FPGA compute nodes and supplying management network through a management network switch module; and step 3, setting a management interface protocol of the SoC FPGA compute nodes, and acquiring operating parameters of the SoC FPGA compute nodes to manage and monitor the SoC FPGA compute nodes based on the management interface protocol through a core control unit;

the self-defined management interface includes: a power supply interface that provides power for SoC FPGA compute nodes, insertion detection pins of the compute nodes are configured to detect whether the SoC FPGA compute nodes are plugged to the motherboard, a Joint Test Action Group (JTAG) debug port for configuring and debugging SoC FPGA computing nodes, and an Inter-Integrated Circuit (IIC) port for monitoring the working status of Soc FPGA compute nodes;

wherein the SoC FPGA compute nodes comprise a self-defined golden finger connected to the self-defined management interfaces, the self-defined golden finger has a height difference from a standard PCIe golden finger of the SoC FPGA compute nodes, and the height difference is greater than or equal to 12.75 mm/501.97 mil.

6. The method for realizing an FPGA server according to claim 5, wherein the management and monitoring functions comprises power on, power off, remote logic configuration of the FPGA, remote debugging, power consumption monitoring, temperature monitoring, serial port interaction and online update of motherboard firmware.

7. The method for realizing an FPGA server according to claim 5, wherein the core control unit comprises a processor portion and a programmable logic portion; a processor core of the processor portion is responsible for operating an operating system or a management program for management, and providing drive service of various management interfaces; the programmable logic portion is used to control interface logic sequence of the plurality of self-defined management interfaces.

8. The method for realizing an FPGA server according to claim 5, wherein the core control unit monitors whether the self-defined management interfaces are plugged with the SoC FPGA compute nodes, and if yes, manages and monitors through the self-defined management interfaces;

the management and monitoring functions comprises monitoring information of power status, the input voltage and input current of all SoC FPGA compute nodes, and monitoring a working state of the SoC FPGA compute nodes plugging into the self-defined management interfaces;

and the self-defined management interfaces, the management network switch module and the core control unit together form a management plane network;

the SoC FPGA compute nodes output user data to a data network switch module through the interface, and data network is isolated from management network of the motherboard.

* * * * *